United States Patent [19]
Trepka et al.

[11] 3,948,872
[45] Apr. 6, 1976

[54] POLYMERIZATION PROCESS FOR PRODUCING LOW CIS-CONFIGURATION HOMOPOLYMERS

[75] Inventors: William J. Trepka; Ralph C. Farrar, both of Bartlesville, Okla.

[73] Assignee: Phillips Petroleum Company, Bartlesville, Okla.

[22] Filed: Jan. 25, 1971

[21] Appl. No.: 109,684

[52] U.S. Cl. .................. 260/94.2 M; 260/94.7 A
[51] Int. Cl. ................. C08f 136/04; C08f 136/06
[58] Field of Search .............. 260/94.2 M, 94.7 R

[56] References Cited
UNITED STATES PATENTS

| | | | |
|---|---|---|---|
| 2,975,160 | 3/1961 | Zelinski | 260/94.2 X |
| 3,301,840 | 1/1967 | Zelinski | 260/94.2 X |
| 3,317,918 | 5/1967 | Foster | 260/83.7 |
| 3,318,862 | 5/1967 | Ainton | 260/94.2 M |

*Primary Examiner*—William F. Hamrock

[57] ABSTRACT

A polymerization process for preparing homopolymers of conjugated dienes having decreased cis-content resulting from the use of organolithium compounds as initiators wherein 1,2-dialkoxybenzene is introduced in a quantity sufficient to decrease the cis-content of the homopolymers formed.

4 Claims, No Drawings

POLYMERIZATION PROCESS FOR PRODUCING LOW CIS-CONFIGURATION HOMOPOLYMERS

This invention relates to a process for polymerizing conjugated dienes. In a more particular aspect, this invention relates to the use of 1,2-alkoxybenzene as a cis-content modifier of homopolymers of conjugated dienes.

Continuing interest in the development of specific catalyst systems which are capable of producing polymers having desired configurations has been shown by the polymerization art. It has been known for a number of years, for example, that n-butyllithium can be used as a catalyst in the polymerization of conjugated dienes. Approximately 80 to 85 percent or more of the polymer formed when butadiene is polymerized in a hydrocarbon solvent in the presence of n-butyllithium is formed by 1,4-addition of the monomer unit. Modification of the aforementioned polymerization process is required in order to decrease the cis-content of the polymers formed thereby. Impact-resistant commercial products flowing from the polymerization industry require polymers having low cis-content.

It is an object of this invention to provide a polymerization process for preparing homopolymers of conjugated dienes having decreased cis-content. Another object of this invention is to provide a modified polymerization process for producing polymers useful in the production of impact-resistant polymers. Other aspects and objects of this invention will hereinafter appear in the examples and claims included hereinbelow.

The instant invention resides in the discovery of a process whereby conjugated dienes can be polymerized with resulting polymers having decreased cis-content. The aforementioned process comprises contacting conjugated dienes having from 4 to 12 carbon atoms per molecule with an organolithium compound in the presence of at least one solvent selected from the group consisting of aromatic, paraffinic and cycloparaffinic hydrocarbons, and a 1,2-dialkoxybenzene modifier. The 1,2-dialkoxybenzene is present in the polymerization zone in a quantity sufficient to decrease the cis-content of the homopolymers formed therein. In the absence of the 1,2-dialkoxybenzene and other modifiers, substantially no decrease in the homopolymer cis-content would occur. Polymerization products prepared in the presence of the 1,2-dialkoxybenzene can also be terminated with multifunctional coupling reagents to provide polymers of increased molecular weight which can also have long chain branching. The organolithium compounds employed as initiators in the process of this invention are represented by the formula $RLi_x$ wherein R is selected from the group consisting of aliphatic, cycloaliphatic aromatic radicals and x is an integer from 1 to 4, inclusive; R has a valence equal to the integer and contains from 1 to 20 carbon atoms, inclusive.

The 1,2-dialkoxybenzenes which can be employed in the process of this invention are represented by the following formula:

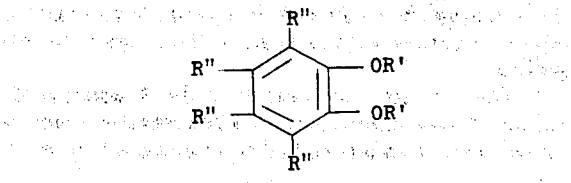

wherein R' is an alkyl radical having in the range of 1 to about 6 carbon atoms, and R" is H or R', the total of all carbon atoms in all R" groups being less than 11 per molecule and at least one R" is H.

Among the 1,2-dialkoxybenzenes which can be employed in the method of this invention are 1,2-dimethoxybenzene, 1,2-diethoxybenzene, 1,2-dihexoxybenzene, 3,4-di-n-pentyl-1,2-dimethoxybenzene, and 3,4,5-triethyl-1,2-dimethoxybenzene.

The 1,2-dialkoxybenzene can be introduced into the polymerization zone in any manner. In one embodiment, it can be reacted with the organolithium and the reaction mixture is introduced into the polymerization zone as the initiator. In another embodiment, the 1,2-dialkoxybenzene is introduced in the polymerization zone into which the organolithium has been introduced as an initiator.

The 1,2-dialkoxybenzenes are employed in accordance with the process of this invention in polymerization reactions which are conducted under any of those reaction conditions conveniently employed in solution polymerizations with organolithium initiators which involves the polymerization of conjugated dienes having from 4 to 12 carbon atoms per molecule to homopolymers thereof. Regardless of the method of their employment, whether they are introduced in the form of a reaction mixture with the organolithium or whether they are introduced into the polymerization zone individually, the 1,2-dialkoxybenzenes will be employed in quantities sufficient to provide from about 0.5 to about 1.5 parts by weight per 100 parts by weight of monomer.

The polymerization process of this invention can be carried out at any temperture within the range of about −100°F to about 300°F, preferably from 0°F to 180°F. The polymerization reaction can be carried out under autogenous pressures. It is usually desirable to operate at pressures sufficient to maintain the monomeric material substantially in the liquid phase. The pressure will thus depend upon the particular material being polymerized, the solvent being employed, and the temperature at which polymerization is carried out. However, higher pressures can be employed if desired, these pressures being obtained by such suitable methods as the pressurization of the polymerization zone with a gas which is inert with respect to the polymerization reaction.

A wide variety of dialkoxybenzenes can be used in the process of this invention. However, the process of this invention will be illustrated employing only a few of the organolithium compounds, dialkoxybenzenes, conjugated dienes, and solvents without meaning to limit the invention to those employed in the examples.

EXAMPLE I

In the following polymerization reactions, 100 parts by weight of butadiene was polymerized in 760 parts by weight of cyclohexane. The dialkoxybenzene (1,2-dimethoxybenzene) was introduced into the reaction mixture in varying amounts as indicated hereinbelow and the butyllithium (n-butyllithium) in the amount of 0.85 mhm was introduced to the reaction mixture. The reaction was conducted at 158°F for about 1 hour. An antioxidant (2,6-di-tert-butyl-4-methylphenol), as a 10 percent by weight solution in a 50/50 by volume mixture of isopropyl alcohol/toluene, was added with the amount added being sufficient to provide about 1 part by weight of the antioxidant per 100 parts by weight of monomer charged. Charge order was as follows: cyclohexane, nitrogen purge, butadiene, modifier, n-butyllithium, 1 hour at 158°F, and antioxidant-terminate. Each mixture was then coagulated with isopropyl alcohol and the polymer separated and dried. Conversion in each run was 100 percent and each polymer was gel-free.

The following three tables illustrate the results of using a 1,2-dialkoxybenzene according to the method of the invention as compared to the results when using known modifiers.

TABLE I

| Run No. | Additive Type | phm (mhm) | Mooney(a) Viscosity | Inherent(b) Viscosity | cis(c) % | trans(c) % | Vinyl(c) % |
|---|---|---|---|---|---|---|---|
| 1 | none | 0 (0) | 27 | 1.99 | 48.4 | 43.6 | 8.0 |
| 2 | 1,2-DMB(d) | 0.5 (3.62) | 34 | 1.86 | 28.9 | 31.8 | 39.3 |
| 3 | do. | 1.0 (7.24) | 36 | 1.87 | 25.3 | 28.5 | 46.2 |
| 4 | do. | 1.5 (10.86) | 36 | 1.85 | 23.1 | 26.6 | 50.3 |

(a)ML-4 at 212°F. ASTM D 1646-63.
(b)Determined according to the procedure of U.S. 3,278,508, column 20, notes a and b.
(c)Determined according to the procedure of U.S. 3,317,503, column 8, lines 19-44, with the extinction coefficient for the vinyl band being 196 rather than 209 as shown.
(d)1,2-Dimethoxybenzene.

TABLE II

| Run No. | Additive Type | phm (mhm) | Mooney(a) Viscosity | Inherent(b) Viscosity | cis(c) % | trans(c) % | Vinyl(c) % |
|---|---|---|---|---|---|---|---|
| 5 | Anisole | 0.5 (4.63) | 27 | 1.98 | 48.2 | 43.8 | 8.0 |
| 6 | do. | 1.0 (9.26) | 25 | 1.98 | 47.2 | 44.4 | 8.4 |
| 7 | do. | 1.5 (13.89) | 25 | 2.30 | 47.8 | 43.9 | 8.3 |

(a)same as in Table I.
(b)same as in Table I.
(c)same as in Table I.

TABLE III

| Run No. | Additive Type | phm (mhm) | Mooney(a) Viscosity | Inherent(b) Viscosity | cis(c) % | trans(c) % | Vinyl(c) % |
|---|---|---|---|---|---|---|---|
| 8 | THF(d) | 0.5 (6.94) | 31 | 1.96 | 37.2 | 43.0 | 19.8 |
| 9 | do. | 1.0 (13.88) | 28 | 1.89 | 34.6 | 41.3 | 24.1 |
| 10 | do. | 1.5 (20.82) | 26 | 1.84 | 34.6 | 38.8 | 26.6 |

(a)same as in Table I.
(b)same as in Table II.
(c)same as in Table II.
(d)Tetrahydrofuran Since 1,2-dimethoxybenzene contains two ether groups per molecule, it would be expected that on a molar basis this compound would be twice as effective as anisole and tetrahydrofuran (monofunctional ethers) in decreasing the cis-content of polybutadiene prepared with n-butyllithium initiator. The above results demonstrate that 1,2-dimethoxybenzene is at least about 5 times as effective as anisole and tetrahydrofuran in decreasing cis-content of n-butyllithium-initiated polybutadiene. In fact, it appears that on a molar basis 1,2-dimethoxybenzene is many times more effective than anisole in decreasing the cis-content of said polybutadiene. The above examples also illustrate that the utilization of 0.5 to about 1.5 parts by weight of 1,2-dimethoxybenzene decreasing the polybutadiene cis-content to ranges below 30 percent (from about 23 percent to about 29 percent).

It will be evident from the foregoing that various modifications can be made to the process of this invention. Such, however, are considered as being within the scope of the invention.

What we claim is:

1. A polymerization process of preparing a homopolymer of a conjugated diene having decreased cis-content, comprising: contacting the conjugated diene having from 4 to 12 carbon atoms per molecule in a polymerization zone with an organolithium compound having the formula $RLi_x$ wherein R is selected from the group consisting of aliphatic, cycloaliphatic, and aromatic radicals, $x$ is an integer from 1 to 4, inclusive, R has a valence equal to the integer and contains from 1 to 20 carbon atoms, inclusive; and a 1,2-dimethoxybenzene:

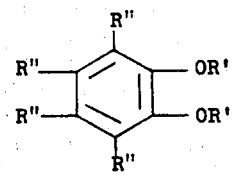

wherein R' is an alkyl radical having in the range of 1 to about 6 carbon atoms, R'' is H or R', the total of all carbon atoms in all R'' groups being less than 11 per molecule and at least one R'' is H'', said 1,2-dimethoxybenzene being present in a quantity sufficient to effect a decreased cis-content of the resulting homopolymer.

2. The process according to claim 1 wherein the 1,2-dimethoxybenzene is introduced into the polymerization zone in an amount of from about 0.5 to about 1.5 parts by weight per 100 parts by weight of the conjugated diene.

3. The process according to claim 2 wherein the conjugated diene is contacted with n-butyllithium.

4. The process of claim 3 wherein said conjugated diene is butadiene and the resulting homopolymer is polybutadiene having a cis-content of from about 23 percent to about 29 percent.

* * * * *